US 11,954,170 B1

United States Patent
Makanju et al.

(10) Patent No.: US 11,954,170 B1
(45) Date of Patent: Apr. 9, 2024

(54) GENERATING CONTENT FEED BASED ON POLICY ASSOCIATED WITH ADJACENT CONTENT

(71) Applicant: Meta Platforms, Inc., Menlo Park, CA (US)

(72) Inventors: Bankole Rasheed Makanju, Seattle, WA (US); Robert Caldwell, Mercer Island, WA (US); Keren Tan, Redmond, WA (US); Vivek Kumar Tyagi, Bellevue, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/944,024

(22) Filed: Sep. 13, 2022

(51) Int. Cl.
*G06F 16/958* (2019.01)
*G06F 16/906* (2019.01)
*G06N 20/00* (2019.01)

(52) U.S. Cl.
CPC .......... *G06F 16/958* (2019.01); *G06F 16/906* (2019.01); *G06N 20/00* (2019.01)

(58) Field of Classification Search
CPC ...... G06F 16/958; G06F 16/906; G06N 20/00
See application file for complete search history.

(56) References Cited

U.S. PATENT DOCUMENTS

| 2015/0365447 A1* | 12/2015 | Klein | G06F 16/00 709/204 |
| 2016/0092938 A1* | 3/2016 | Tang | G06Q 30/0277 705/14.73 |
| 2019/0166404 A1* | 5/2019 | Zhao | H04N 21/252 |

* cited by examiner

*Primary Examiner* — Etienne P Leroux
(74) *Attorney, Agent, or Firm* — Greenberg Traurig, LLP

(57) ABSTRACT

A method for generating a content feed includes receiving, from a content provider, a target content item and a policy for the target content item, specifying a prohibited classification of the content that cannot be published adjacent to the target content item. The method also includes identifying a slot in a content feed including multiple content items. A machine learning model is then accessed and applied to two adjacent content items that are adjacent to the slot to determine whether each of the adjacent content items is the prohibited classification. Responsive to determining that the adjacent content items are not the prohibited classification, the target content item is placed in the slot, and the content feed including the target content item is sent for display to a viewing user.

20 Claims, 5 Drawing Sheets

GENERATING CONTENT FEED BASED ON POLICY ASSOCIATED WITH ADJACENT CONTENT

BACKGROUND

This disclosure relates generally to generating a content feed for display to a user. More specifically, this disclosure relates to classifying a content item into a classification and determining whether to place a target content item next to the content item based on policy for the target content item and the classification of the content item.

A content feed is a sequence of content items that are to be provided to users. It may be used to provide content recommendations, targeting certain audiences based on user profiles and/or historical user behaviors. For example, a content feed manager may add recent news and updates to a content feed and share this content feed with users. For example, a first user who often searches for sports-related topics may be presented with a content feed including different sports news or products related to different sports, and a second user who often searches for fashion-related topics may be presented with a content feed including different fashion news or products related to the current fashion trend. Using content feeds, users can see different content items provided by different content providers without having to navigate to those content providers' sites. Users also can click a content item to be directed to the content provider's site to obtain additional information related to the content item.

In some cases, a content feed may include user-generated content items, brand-generated content items, and/or a combination thereof. Existing content aggregators or content feed managers generally manage content feed based on audience-based topic exclusion control, which filters at a user level based on what the users tend to look at or click through, such that their feeds will be dominated by those topics.

SUMMARY

A content feed is a sequence of content items that are to be provided to users. In some cases, a content feed may include user-generated content items, brand-generated content items, and/or a combination thereof. However, certain users or brands may or may not want their content items to be placed adjacent to another content item or a particular type of content item in a feed, such as (but not limited to) nudity content, violence content, and/or political content.

One or more embodiments address the above-described problem by using a machine learning model to classify whether each adjacent content item is in a prohibited class based on a policy for a target content item, and only allow the target content item to be placed in a slot between the adjacent content items when the adjacent content items are not in a prohibited class.

In accordance with one or more aspects of the disclosure, a content feed manager is configured to receive, from a content provider, a target content item and a policy for the target content item. The content feed manager is also configured to generate, for a viewing user of an online system, a content feed including multiple content items, and identifies a slot in the content feed. The slot is between two adjacent content items of the multiple content items in the content feed. The content feed manager then accesses a machine learning model trained to classify whether a content item is the prohibited classification. In some embodiments, the machine learning model is trained based on a set of training examples that includes features about multiple content items and labels for each of the other content items of whether each of the multiple content items is the prohibited classification.

The content feed manager then applies the trained machine learning model to each of the adjacent content items to determine whether each of the adjacent content items is the prohibited classification, and determines whether to place the target content item in the slot based on whether either of the adjacent content items is the prohibited classification. Responsive to determining to place the target content item in the slot, the content feed manager inserts the target content item in the slot, and sends the content feed containing the target content item for display to the viewing user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
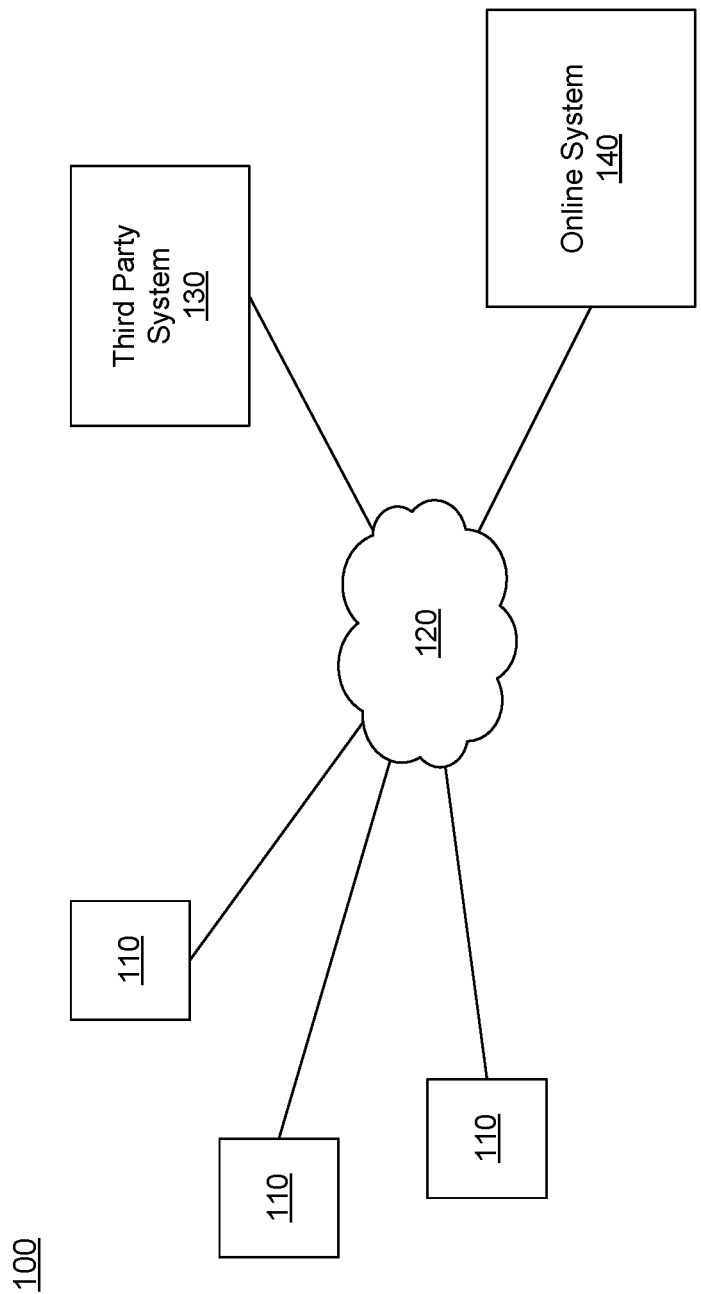
FIG. 1 is a block diagram of a system environment in which an online system operates, in accordance with an embodiment.

FIG. 1 is a block diagram of a system environment 100 for an online system 140.

The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
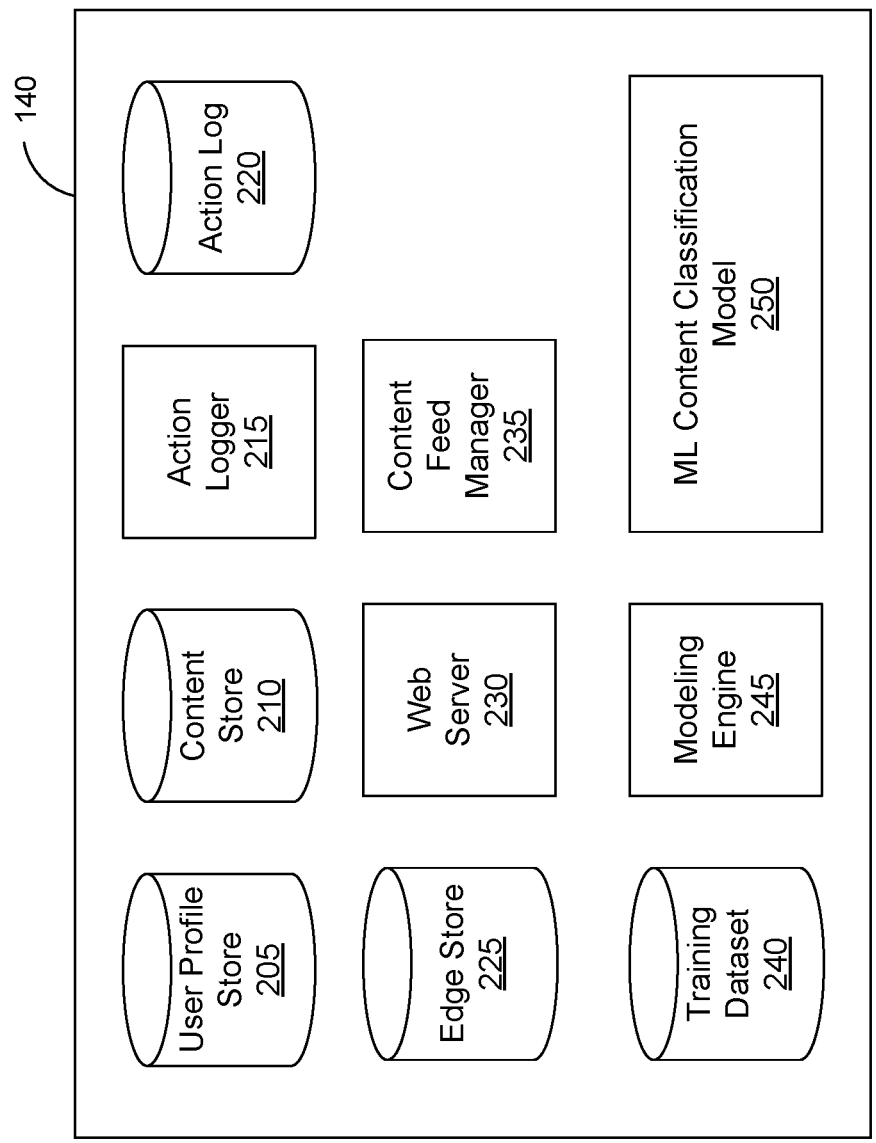
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a web server 230, a content feed manager 235, a training dataset 240, a modeling engine 245, and a machine learning content classification model 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 may or may not receive compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 230 links the online system 140 via the network 120 to the one or more client devices 110, as well as to the one or more third party systems 130. The web server 230 serves web pages, as well as other content, such as JAVA®, FLASH®, XML and so forth. The web server 230 may receive and route messages between the online system 140 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 210. Additionally, the web server 230 may provide application programming interface (API) functionality to send data directly to native client device operating systems, such as IOS®, ANDROID™, or BlackberryOS.

The content feed manager 235 assembles content items in the content store 210 and/or content items from third party content providers into content feeds, and provides the content feeds to the client devices 110 for display. The content feeds may be generated based on user profiles and/or classifications of content items.

Machine Learning Content Classification Model

The machine learning content classification model 250 is configured to classify content items into one or more classifications. For example, in some embodiments, the machine learning content classification model 250 is trained to classify a given content item such as nudity, violence, or politics. Alternatively, in some embodiments, the content classification model 250 is trained to classify a given content item as good, medium, or bad. The content classification model 250 is trained by the modeling engine 245 using a training dataset 240. Additional details about the content feed manager 235, the training dataset 240, the modeling engine 245, and the machine learning content classification model 250 are further described below with respect to FIGS. 3-5.

Figure 3:
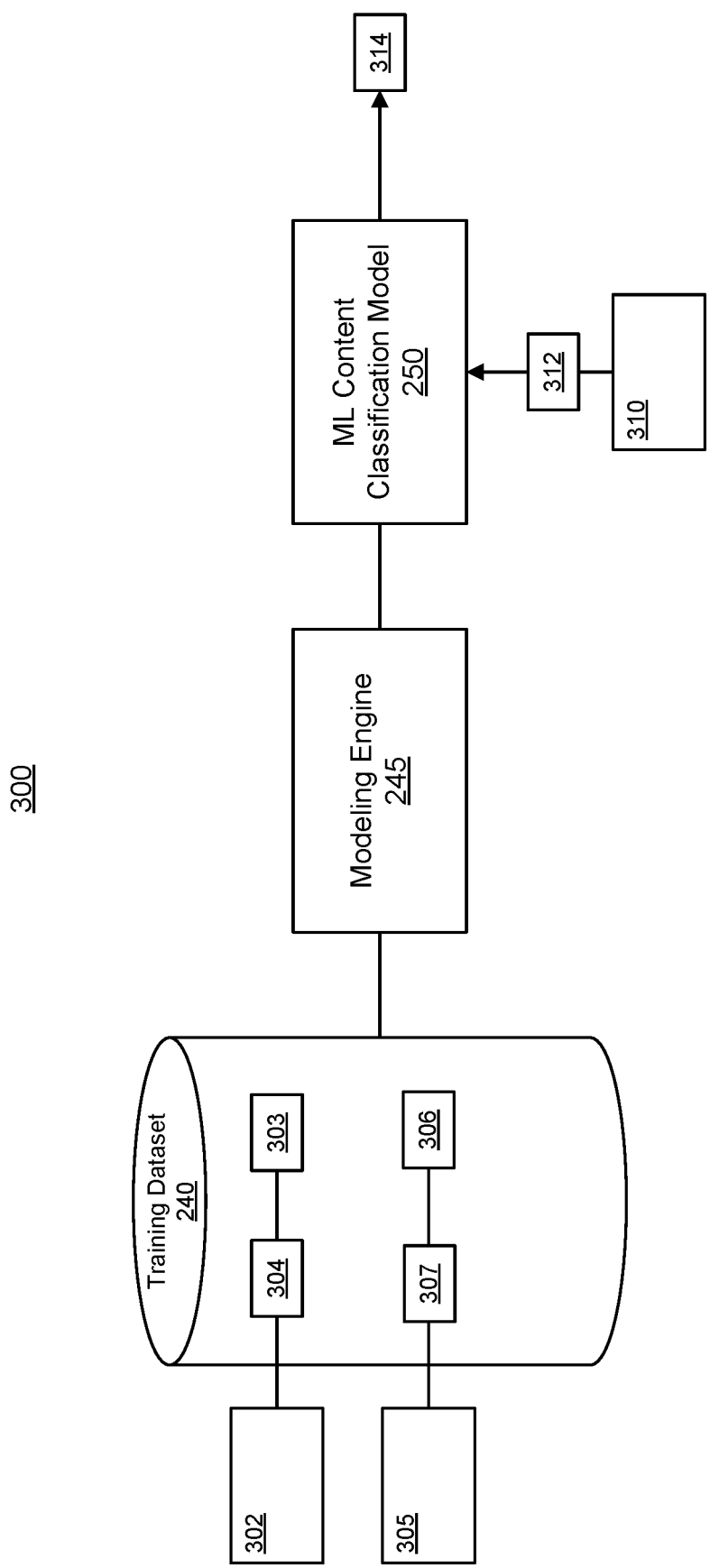
FIG. 3 illustrates an example process of training the machine learning content classification model, using a training dataset.

FIG. 3 illustrates an example process 300 of training the machine learning content classification model 250, using training dataset 240. The training dataset 240 includes multiple training examples. The training examples include features 304, 307 about multiple content items 302, 305 and labels 303, 306 for each of the content items. The labels 303, 306 indicate a classification of the content items or whether the content item is a prohibited classification. The modeling engine 245 is configured to process the features 304, 307 and the labels 303, 306 corresponding to the content items 302, 305 to train the content classification model 250.

The features 304, 307 may include content-specific features and/or user engagement features. The content-specific features may include (but are not limited to) features associated with the images or pixels of media content items, such as whether each pixel represents human skin, or whether a magnitude change of a vector over time is greater than a threshold. The content-specific features may also include (but are not limited to) features associated with text contained in the content items, such as whether political terms are shown in the content items. The content specific features may also include features associated with a creator, an original poster, a re-poster, a commenter, and/or a responder of the content item. The user engagement features may include whether most of the users reacted positively (e.g., clicks thumb up, responds with happy emoji) or negatively (e.g., clicks thumb down, responds with angry emoji, or flags the content item as inappropriate) to the content item.

In some embodiments, the labels 303, 306 are generated by human raters. For example, the human raters manually review the examples of the content items, and manually rate whether each content item contains nudity, violence, and/or politics. In some embodiments, the labels 303, 306 are organically generated by users of the online system 140. For example, users may be able to flag a content item posted on the online system as containing nudity, violence, politics, or otherwise inappropriate. In some embodiments, these flagged content items can be used as training data. Alternatively, or in addition, the flagged content items are further processed to be attached with labels. For example, if a content item is flagged as nudity by more than 30% of the viewers, the content is labeled as nudity. If a content item is flagged as containing nudity by less than 30% of the viewers, the content is labeled as some nudity. If a content item is not flagged as containing nudity by any viewer, the content is labeled as non-nudity.

Using the training dataset 240, the content classification model 250 is trained such that, responsive to receiving a given content item 310, associated with one or more features 312, the content classification model 250 is configured to output a classification 314, indicating the classification of the given content item 310.

In some embodiments, the classification may be good or bad. In some embodiments, the classification may be good, medium, or bad. In some embodiments, the classification may be violent or non-violent, nudity or non-nudity, political or non-political, etc. In some embodiments, multiple classification models are trained, and each of the classification models is trained to determine whether a content item is a particular classification or not. For example, a first model may be trained to determine whether a content item contains violence, some violence, or non-violence, a second model may be trained to determine whether a content item contains nudity, some nudity, or non-nudity, and/or a third model may be trained to determine whether a content item is political, medium political, or non-political.

In some embodiments, the content classification model 250 is trained to generate a score indicating a relative level of the content item. For example, the classification may be a numeric number between 0-10 for nudity, violence, and/or political, where 0 as non-nudity, non-violence, or non-political, and 10 as the highest level of nudity, violence, or political.

Each classification model may be trained via a different machine learning method. For example, the nudity classification model may be trained by detecting skin-colored pixels in an image, locating or forming skin regions based on the detected skin pixels, and analyzing the skin regions for clues of nudity or non-nudity.

As another example, the violence classification model may use features such as (but not limited to) optical flow, space-time interest points, and motion binary patterns. In some embodiments, a type of optical flow descriptor that may be used to detect violence is the crowd scenes. The crowd scenes may be identified and used to calculate the statistics of how the flow vectors magnitude changes over time to detect the change in violence and non-violence behavior. Alternatively, or in addition, the orientation of flow vectors in addition to magnitude values may be used as features to detect violence. Alternatively, or in addition, spatial-temporal features may be extracted from a candidate location to detect violence.

In yet another example, the political classification model may use natural language processing techniques to identify political inclination of a message or a news article, or identify a writer's opinion concerning specific political issues or actions related to those.

Figure 4:
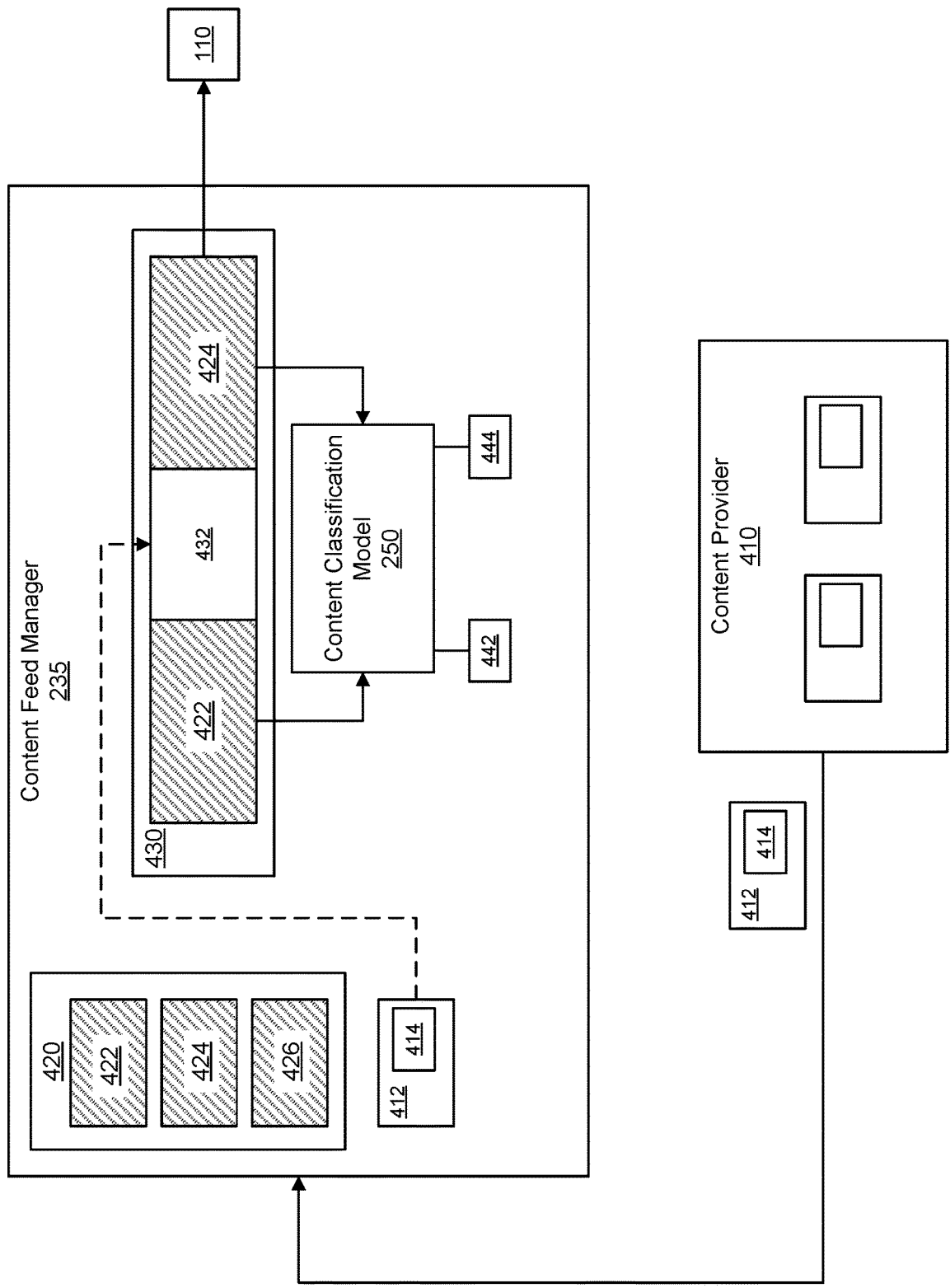
FIG. 4 is a block diagram of the content feed manager.

FIG. 4 is a block diagram of the content feed manager 235. In some embodiments, the content feed manager 235 has access to a content repository 420 containing multiple content items 422, 424, 426. Such content may be organically generated by users using the online system 140. In some embodiments, the content feed manager 235 also receives content from one or more content provider(s) 410. The content provider(s) 410 may include news outlets, brand sites, e-commerce sites, and/or other third-party systems.

The content feed manager 235 uses the content in the repository 420 and content received from the content provider(s) 410 to assemble a content feed for display to a user at client device 110. Each content feed includes multiple content items. In some embodiments, the content feed manager 235 assembles a content feed based on a user profile, a search query entered by a user, or an action log of a user containing a user's historical interactions with different types of content. Alternatively or in addition, the content feed manager 235 assembles the content feed further based on policies associated with some of the content items.

For example, the content feed manager 235 may first identify a plurality of content items from the repository 420 based on the user profile or the user's action log. For example, the user may have interacted with fashion-related content frequently. The content feed manager 235 selects a plurality of fashion-related content items from the repository 420 and generates a content feed for the user. Such content items may be organically generated by users of the online system 140 or obtained from other third-party content providers.

On the other hand, the content feed manager 235 also receives, from a content provider 410, a target content item 412 to be displayed for the user. The target content 412 is associated with a policy 414. The policy 414 specifies a prohibited classification (and/or allowed classification) of content that cannot be (and/or can be) published adjacent to the target content item 412.

In some embodiments, the policy 414 is content provider 410 specific. For example, when the content provider 410 is a brand site, the brand site may have a single policy that requires all of their content items not to be displayed adjacent to political content. Such policy may be sent to the content feed manager 235 when the content provider 410 was registered or set up to provide content items to the content feed manager 235. Once the policy is set up, the content provider 410 may also make changes to its policy later at any time. In some embodiments, the content manager 235 provides a web portal or an application for content providers to enter or update their policies. The content feed manager 235 may then store the policies from different content providers in a local storage. In response to receiving a target content 412 from the content provider 410, the content feed manager 235 retrieves the policy associated with the content provider 410 from the storage.

In some embodiments, the policy 414 is content item specific. For example, each content item may be associated with a separate policy. Such a policy may be stored with each content item as metadata. The content provider 410 is configured to send the content item 412 and its corresponding policy 414 together as a single message or two consecutive messages. Responsive to receiving the message(s) containing content item 412 and/or its corresponding policy 414, the content feed manager 235 parses the message to identify the content item 412 and its corresponding policy 414.

In some embodiments, only certain content items received from content provider 410 have policies associated therewith. In some embodiments, the content items stored in the content repository 420 also have policies associated therewith. The content feed manager 235 is configured to identify all the applicable policies associated with all the content items in a content feed, and make sure that the content feed complies with all the applicable policies.

For example, assuming the content items 422, 424, 426 stored in the content repository 420 are not associated with any policies. The content feed manager 235 first assembles a content feed selecting a subset of content items 422, 424 from the content repository 420. The content feed manager 235 then identifies a slot 432 in the content feed. As illustrated, the slot 432 is between two adjacent content items 422, 424 in the content feed 430. The content feed manager 235 also receives a target content item 412 and its corresponding policy 414 from the content providers 410. The policy 414 specifies a prohibited classification of content that cannot be published adjacent to the target content item 412.

Because of the existence of the policy 414, the content feed manager 235 needs to make sure that the adjacent content items 422, 424 are not the prohibited classification. To determine whether the adjacent content items 422, 424 are the prohibited classification, the content feed manager 235 accesses the trained content classification model 250, and applies the trained content classification model 250 to each of the two adjacent content items 422, 424 to determine a classification 442, 444 for each of the two adjacent content items 422, 424. The classifications 442, 444 for the two adjacent content items 422, 424 are then compared with the prohibited classification specified in the policy 414 to determine whether the classifications 442, 444 are prohibited or allowed classifications for the target content item 412. The content feed manager 235 then determines whether to place the target content item 412 in the slot 432 based on whether either of the adjacent content items 422, 424 is the prohibited classification. Responsive to determining to place the target content item 412 in the slot 432, the content feed manager 235 inserts the target content item in the slot 432 and sends the content feed to the client device 110 for display to the viewing user.

For example, the content provider 410 may be a brand site, and the policy 414 may specify that political content cannot be published adjacent to the target content item. The content classification model 250 determines that none of the adjacent content 422, 424 are political content. Responsive to such a determination, the content feed manager 235 inserts the content 412 into the slot 432 to generate the content feed, and sends the content feed to the client device 110 for display to the viewing user.

On the other hand, if the content classification model 250 determines that at least one of the adjacent content 422, 424 is the prohibited classification, the content feed manager 235 will prevent the content 412 to be inserted into the slot 432. In some embodiments, responsive to determining that at least one of the adjacent content items 422, 424 is the prohibited classification, the content feed manager 235 requests for a new content item from the same content provider 410 or a different content provider. The new content item may be associated with a same or a different policy. When the new content item is received, the content feed manager 235 determines whether the new content item can be inserted in the slot 432 based on the policy for the new content item.

In some embodiments, responsive to determining that at least one of the adjacent content 422, 424 is the prohibited classification, the content feed manager 235 requests for a new content item from the same or a different content provider with the classifications of the adjacent content items 422, 424, causing the content provider to select a new content item that does not have a policy that prohibits the classification of the adjacent content items 422, 424. Responsive to receiving the new content item, the content feed manager 235 can then insert the new content item into the slot 432, and sends the content feed, including the new content item for display to the viewing user.

In some embodiments, responsive to determining that at least one of the adjacent content 422, 424 is the prohibited classification, the content feed manager 235 selects one or more new adjacent content items from the repository to replace the adjacent content items 422, 424. When the new adjacent content items are selected, the content feed manager 235 applies the content classification model 250 to the new adjacent content items again to determine whether they are the prohibited classification.

In some embodiments, after the content feed manager 235 applies the content classification model 250 to the content items 422, 424, the classifications of the adjacent content items are stored as metadata with the content items 422, 424 in the repository 420. As such, when a content feed is generated to include the same content item 422 or 424 again, the content feed manager 235 can retrieve its classification from the metadata without having to apply the content classification model 250 again.

In some embodiments, when a content item is generated (e.g., by a user of the online system 140), the online system 140 applies the content classification model 250 to the content item to determine its classification on the fly, and stores the classification with the content item as metadata. In some embodiments, all the content items 422, 424, 426 in the content repository 420 are batch processed by the content classification model 250, and the classification for each content items is stored with the content item as metadata. As such, when any one of the content items 422, 424, 426 in the content repository 420 is selected to form a content feed, its classifications can be obtained directly from the metadata.

In some embodiments, the adjacent content items 422, 424 in a content feed are displayed sequentially in time. The slot 432 is a time slot between the adjacent content items 422, 424. In some embodiments, a single content item may be broken down into multiple pieces, and the slot 432 is a slot between different pieces of the same content item.

In some embodiments, the policy 414 for the target content item 412 may have different definitions of being "adjacent." For example, a policy may define that adjacent means directly adjacent (including before and after) to another content item, and only the directly adjacent content item is required not to be the prohibited classification. As another example, the policy 414 may define a time frame, within which means adjacent. For example, if a directly adjacent content item is shorter than the time frame, another content item before or after the directly adjacent content item may also be deemed as adjacent based on the policy. As such, the indirectly adjacent content also needs to meet the policy requirement. On the other hand, if a directly adjacent content item is longer than the time frame, only a portion of the directly adjacent content item needs to meet the policy requirement.

In some embodiments, the adjacent content items 422, 424 in a content feed are displayed adjacent to each other physically in a user interface. The slot 432 is a space slot between the adjacent content items 422, 424. In some embodiments, the policy 414 may define adjacent as directly adjacent to another content item physically. In some embodiments, the policy 414 may define adjacent as within a distance (e.g., within a number of lines of text, within an inch, within a number of content items) from another content item. In such cases, more than two content items may be deemed as adjacent, and each of these content items needs to comply with the policy for the target content item.

In some embodiments, the policy further specifies different classification requirements for different distances. For example, a policy may specify that a direct adjacent content items cannot be classified as bad or medium, and a content item that is further away from the direct adjacent content cannot be classified as bad.

In some embodiments, the policy may specify a score threshold for adjacent content items, including the directly adjacent content items or indirectly adjacent content items. Different weights may be assigned to the different directly or indirectly adjacent content items. The further away the adjacent content item is, the less weight is assigned to the adjacent content item. An overall score may be computed for the adjacent content items based on their classifications and weights. In some embodiments, each content item in the content feed may be considered, and an overall score is generated based on the classification of each content item in the content feed.

Responsive to an overall score of the adjacent content items or the content feed, the content feed manager 235 may reorganize the content items to move the content items that are a prohibited classification to be further away from the target content item, and the content items that are not the prohibited classification to be closer to the target content item.

In some embodiments, the content feed manager 235 selects one content item at a time. For example, the content feed manager 235 selects a first content item 422 from the content repository 420, then receives a target content item 412 and its corresponding policy 414 from the content provider 410. After the content feed manager 235 determines that the first content item 422 complies with the policy 414, the content feed manager 235 appends the target content item 412 to the first content item 422. The content feed manager 235 then selects a second content item 424, and determines whether the second content item 424 complies with the policy 414. If the second content item 424 also complies with the policy 414, the second content item 424 is appended to the target content item 412.

In some embodiments, when an adjacent content item does not comply with the policy 414 of the target content item 412, the adjacent content item is replaced with a new adjacent content item that complies with the policy 414, or the target content item 412 is replaced with a new target content item 412 associated with a policy that does not prohibit the classification of the adjacent content items 422 and 424. This process can repeat as many times as necessary to build a content feed including any number of content items.

In some embodiments, the content feed manager 235 selects an adjacent content item, and sends the classification of the content item to one or more content providers. The one or more content providers determine whether they would like to provide a target content item for display next to the adjacent content item. For example, the content feed manager 235 selects a first adjacent content item 422 and obtains a classification of the first adjacent content item 422 (which may be performed by applying the content classification model 250 on the fly, or retrieving the classification generated by batch processing all the content items 422, 424, 426 in the content repository 420 using the content classification model 250 ahead of the time). The content feed manager 235 then sends a request for a target content item to the content provider 410, the request including the classification of the adjacent content item 422. Responsive to receiving the request, the content provider 410 determines whether a target content item and/or which target content item is to be provided.

Figure 5:
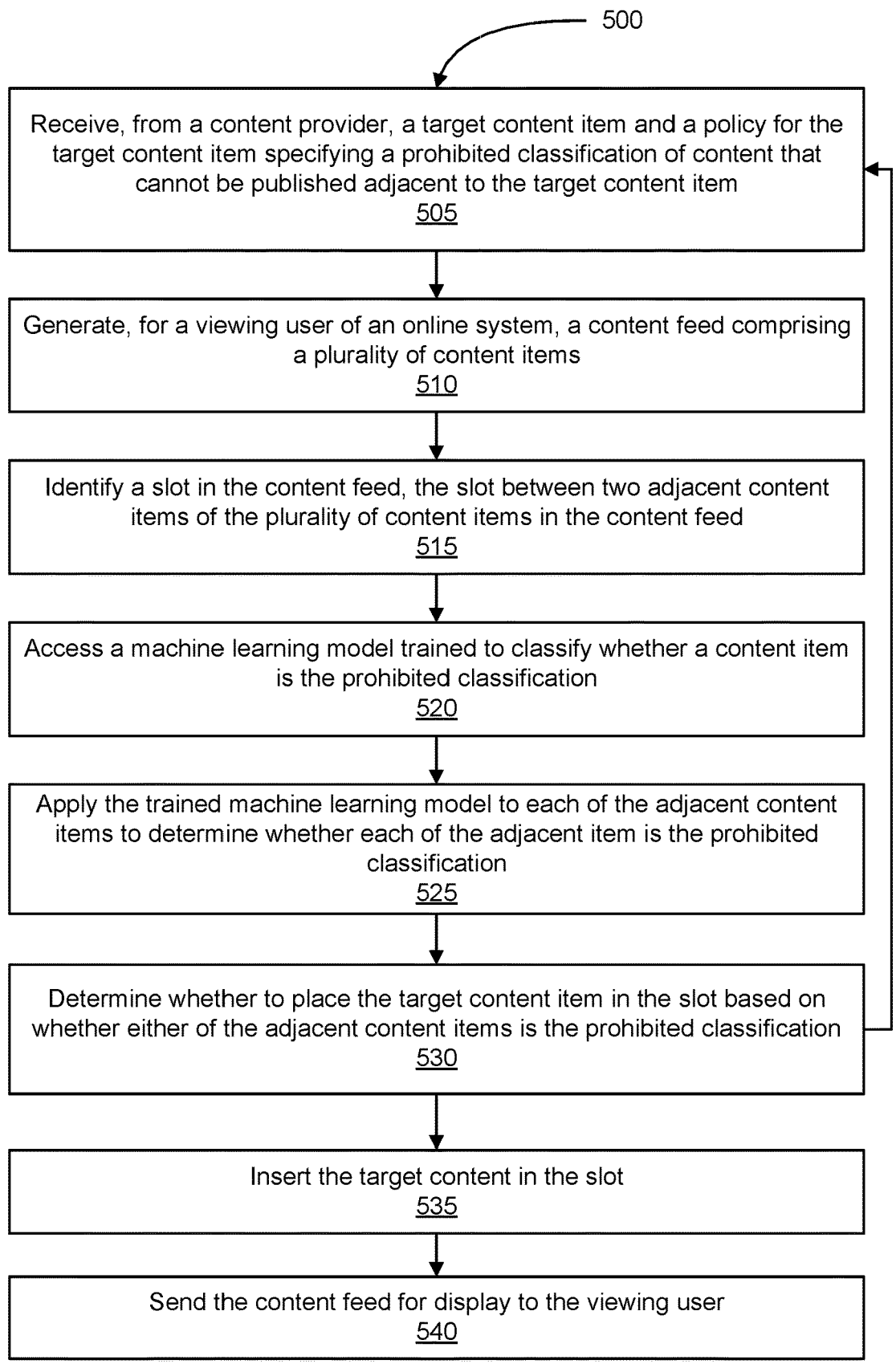
FIG. 5 is a flowchart of an example method for generating a content feed for display to a viewing user, according to an embodiment.

FIG. 5 is a flowchart of an example method 500 for generating a content feed for display to a viewing user, according to an embodiment. In other embodiments, the method may include different and/or additional steps than those shown in FIG. 5. Additionally, steps of the method may be performed in different orders than the order described in conjunction with FIG. 5 in various embodiments.

The method 500 may be performed by the online system 140. The online system 140 receives 505, from a content provider (e.g., third party system 130, content provider 410), a target content item and a policy for the target content item. The policy specifies a prohibited classification of content that cannot be published adjacent to the target content item. For example, the policy may specify that the target content item cannot be displayed adjacent to violent content or political content. In some embodiments, being adjacent means physically adjacent to a content item on a display. In some embodiments, being adjacent means contiguous in time or sequence.

The online system 140 also generates 510, for a viewing user of an online system, a content feed comprising a plurality of content items. In some embodiments, the plurality of content items may be generated organically by users of the online system. Alternatively, or in addition, the plurality of content items may be provided by third party systems, such as a news site, a brand site, an e-commerce site, etc. In some embodiments, the plurality of content items are selected based on the user profile of the viewing user.

In some embodiments, generating the content feed includes accessing a content repository containing a plurality of content items and selecting one or more content items from the plurality of content items to form the content feed. In some embodiments, one or more content items are selected based on a user profile of the viewing user or an action log of the viewing user. The action log of the viewing user records may record information about actions the viewing user performed on the online system, content provider systems, and/or other third party system, including webpage viewing histories, advertisements that were engaged, purchases made, and other patterns from shopping and buying.

The online system 140 also identifies 515 a slot in the content feed. The slot is between two adjacent content items of the plurality of content items in the content feed. In some embodiments, each content item is a short video or a portion of a long video. The content feed is configured to sequentially display the plurality of content items. The adjacent content items are the two content items that are to be displayed contiguously in time or sequence. The slot is a time slot between the two adjacent content items. Alternatively, in some embodiments, the adjacent content items are the two content items that are to be simultaneously displayed to the viewing user in a user interface, and the adjacent content items are physically adjacent to the target content item in the user interface. The slot is a space slot between the two adjacent content items on the user interface.

The online system 140 also 520 accesses a machine learning model (e.g., machine learning content classification model 250) trained to classify whether a content item is the prohibited classification. The machine learning model is trained based on a set of training examples. The training examples include features (e.g., features 304, 307) about a plurality of other content items (e.g., content items 302, 305) and labels (e.g., labels 303, 306) for each of the other content items of whether the other content item is the prohibited classification.

In some embodiments, the features may include content-specific features and/or user engagement features. The content-specific features may include (but are not limited to) features associated with the images or pixels of media content items, such as whether each pixel represents human skin, or whether a magnitude change of a vector over time is greater than a threshold. The content-specific features may also include (but are not limited to) features associated with text contained in the content items, such as whether political terms are shown in the content items. The content specific features may also include features associated with a creator, an original poster, a re-poster, a commenter, and/or a responder of the content item. The user engagement features may include whether most of the users reacted positively (e.g., clicks thumb up, responds with happy emoji) or negatively (e.g., clicks thumb down, responds with angry emoji, or flags the content item as inappropriate) to the content item.

The online system 140 applies 525 the trained machine learning model to each of the adjacent content items to determine whether each of the adjacent content items is the prohibited classification. Each of the adjacent content items corresponds to a set of features. The trained machine learning model takes the set of features as input to determine whether the corresponding adjacent content item is a prohibited classification. The prohibited classification may include (but is not limited to) nudity, violence, and/or political. In some embodiments, the policy may further specify a discrete level or a numeric score as a threshold associated with the prohibited classification. For example, the policy may specify that a nudity level of the adjacent content needs to be lower than 5 (out of 10), and a political level of the adjacent content needs to be lower than 3 (out of 10).

In some embodiments, the plurality of content items in the content repository are batch processed by the trained machine learning model. For example, for each of the plurality of content items in the content repository, the machine learning model is applied to the content item to determine a classification of the content item, and the classification is stored as metadata of the content item in the repository.

In some embodiments, the two adjacent content items are indirectly adjacent to the target content, for example, the adjacent items may be N items away from the target content item in the content feed, where N is fewer than a predetermined threshold. In some embodiments, the policy for the target content item is associated with N, where the greater N is, the less strict the policy is. For example, each content item may be classified as very political, medium political, or non-political. When a content item in the content feed is directly adjacent to the target content item, the policy may require that the adjacent content item cannot be very political or medium political. When a content item in the content feed is indirectly adjacent (e.g., less than 2 items away from) to the target content item, the policy may require that the adjacent item cannot be very political, and medium political is allowed. When a content item in the content feed is 2 or more items away from the target content item, the policy may specify no restrictions.

After the online system 140 applies the trained machine learning model to each of the adjacent content items, the online system 140 then determines 530 whether to place the target content item in the slot based on whether either of the adjacent content items is the prohibited classification. In some cases, the policy for the target content item may specify that no more than one of the adjacent content items can be the prohibited classification. In such a case, one of the adjacent content items being the prohibited classification does not prevent the target content item to be placed in the slot. In some cases, the policy for the target content item may specify that none of the adjacent content items can be the prohibited classification. In such a case, one of the adjacent content items being the prohibited classification would prevent the target content item to be placed in the slot.

Responsive to determining to place the target content item in the slot, the online system 140 inserts 535 the target content in the slot, and sends 540 the content feed including the target content item for display to the viewing user. On the other hand, in some embodiments, when the online system 140 determines not to place the target content item in the slot, the online system 140 may request from the same content provider or a different content provider a new target content item. Alternatively, the online system 140 may remove the adjacent content item that is the prohibited classification.

On the other hand, in some embodiments, responsive to determining that at least one of the adjacent content, is the prohibited classification, the online system 140 requests for a new target content item from the same or a different content provider with the classifications of the adjacent content items, causing the content provider to select a new target content item that does not have a policy that prohibits the classification of the adjacent content items. Responsive to receiving the new target content item, the online system 140 can simply insert the new content item into the slot, and sends the content feed including the new content item for display to the viewing user.

Alternatively, in some embodiments, responsive to determining that at least one of the adjacent content is the prohibited classification, the online system 140 selects one or more new adjacent content items from the repository to replace the adjacent content items that are in the prohibited class. When the new adjacent content items are selected, the online system 140 applies the trained machine learning model to the new adjacent content items again to determine whether they are the prohibited classification. Alternatively, in some embodiments, the classification is stored with the content items as metadata, and the online system 140 retrieves the metadata associated with the new adjacent content items to determine whether they are the prohibited classification. Alternatively, in some embodiments, the online system 140 filters the content items based on their classifications to directly select new adjacent content items that are not the prohibited classifications.

In some embodiments, the online system 140 selects one content item at a time. For example, the online system 140 selects a first content item from the content repository, then receives a target content item and its corresponding policy from the content provider. After the online system determines that the first content item complies with the policy, the online system then selects a second content item, and determines whether the second content item complies with the policy.

Each time when an adjacent content item does not comply with the policy of the target content item, the adjacent content item is replaced with a new adjacent content item that complies with the policy, or the target content item is replaced with a new target content item associated with a policy that does not prohibit the classification of the adjacent content item. This process may repeat as many times as necessary to assemble a content feed, including any number of content items.

In some embodiments, the content feed manager selects an adjacent content item, and sends the classification of the content item to one or more content providers. The one or more content providers determine whether they would like to provide a target content item for display next to the adjacent content item. For example, the online system 140 selects a first adjacent content item and obtains a classification of the first adjacent content item (which may be performed by applying the trained machine learning model on the fly, or retrieving the classification generated by batch processing all the content items in the repository using the trained machine learning model ahead of the time). The content feed manager then sends a request for a target content item to the content provider, the request including the classification of the adjacent content item. Responsive to receiving the request, the content provider determines whether a target content item and/or which target content item is to be provided.

Alternative Embodiments

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
  receiving, from a content provider, a target content item and a policy for the target content item specifying a prohibited classification of content that cannot be published adjacent to the target content item;
  generating, for a viewing user of an online system, a content feed comprising a plurality of content items;
  identifying a slot in the content feed, the slot between two adjacent content items of the plurality of content items in the content feed;
  accessing a machine learning model trained to classify whether a content item is the prohibited classification, wherein the machine learning model is trained based on a set of training examples that comprise features about a plurality of other content items and labels for each of the other content items of whether the other content item is the prohibited classification;
  applying the trained machine learning model to each of the adjacent content items to determine whether each of the adjacent content items is the prohibited classification;
  determining whether to place the target content item in the slot based on whether either of the adjacent content items is the prohibited classification;
  selectively placing the target content item in the slot or in another location of the content feed based on the determining; and
  sending the content feed including the target content item for display to the viewing user.

2. The method of claim 1, wherein generating, for a viewing user of an online system, the content feed comprising a plurality of content items comprises:
  accessing a content repository containing a plurality of content items; and
  selecting one or more content items from the plurality of content items to form the content feed based on a user profile of the viewing user or an action log of the viewing user.

3. The method of claim 2, wherein applying the trained machine learning model to each of the adjacent content items comprises, for each of the plurality of content items in the content repository,
  applying the machine learning model to the content item to determine a classification of the content item; and
  storing the classification as metadata of the content item.

4. The method of claim 1, wherein the two adjacent content items and the target content item are sequentially displayed to the viewing user in time.

5. The method of claim 1, wherein the two adjacent content items and the target content item are simultaneously displayed to the viewing user in a user interface, and the adjacent content items are physically adjacent to the target content item.

6. The method of claim 1, wherein the two adjacent content items are directly adjacent to the target content item.

7. The method of claim 1, wherein the two adjacent content items are N items away from the target content item in the content feed, where N is fewer than a predetermined threshold.

8. The method of claim 7, wherein the policy for the target content item increases in strictness with a number of items from the target content item to the adjacent content items in the content feed.

9. The method of claim 7, wherein the policy is further associated with all the adjacent content items that are no more than a predetermined time frame away from the target content item in the content feed.

10. The method of claim 9, wherein the policy assigns a first weight to an adjacent content item that is directly adjacent to the target content item, and assigns a second weight to a second adjacent content item that is not directly adjacent to the target content item, where the first weight is greater than a second weight.

11. A computer program product comprising a non-transitory computer-readable storage medium containing computer program code for:
   receiving, from a content provider, a target content item and a policy for the target content item specifying a prohibited classification of content that cannot be published adjacent to the target content item;
   generating, for a viewing user of an online system, a content feed comprising a plurality of content items;
   identifying a slot in the content feed, the slot between two adjacent content items of the plurality of content items in the content feed;
   accessing a machine learning model trained to classify whether a content item is the prohibited classification, wherein the machine learning model is trained based on a set of training examples that comprise features about a plurality of other content items and labels for each of the other content items of whether the other content item is the prohibited classification;
   applying the trained machine learning model to each of the adjacent content items to determine whether each of the adjacent content items is the prohibited classification;
   determining whether to place the target content item in the slot based on whether either of the adjacent content items is the prohibited classification;
   selectively placing the target content item in the slot or in another location of the content feed based on the determining, and
   sending the content feed including the target content item for display to the viewing user.

12. The computer program product of claim 11, wherein generating, for a viewing user of an online system, a content feed comprising a plurality of content items comprises:
   accessing a content repository containing a plurality of content items; and
   selecting one or more content items from the plurality of content items to form the content feed based on a user profile of the viewing user or an action log of the viewing user.

13. The computer program product of claim 12, wherein applying the trained machine learning model to each of the adjacent content items comprises: for each of the plurality of content items in the content repository,
   applying the machine learning model to the content item to determine a classification of the content item; and
   storing the classification as metadata of the content item.

14. The computer program product of claim 11, wherein the two adjacent content items and the target content item are sequentially displayed to the viewing user.

15. The computer program product of claim 11, wherein the two adjacent content items and the target content item are simultaneously displayed to the viewing user in a user interface, and the adjacent content items are physically adjacent to the target content item.

16. The computer program product of claim 11, wherein the two adjacent content items are directly adjacent to the target content item.

17. The computer program product of claim 11, wherein the two adjacent content items are N items away from the target content item in the content feed, where N is less than a predetermined threshold.

18. The computer program product of claim 17, wherein the policy increases in strictness with a number of items from the target content item to the adjacent content items in the content feed.

19. The computer program product of claim 17, wherein the policy is associated with all the adjacent content items that are no more than the predetermined threshold away from the target content item in the content feed.

20. The computer program product of claim 19, wherein the policy assigns a first weight to an adjacent content item that is directly adjacent to the target content item, and assigns a second weight to a second adjacent content item that is not directly adjacent to the target content item, where the first weight is greater than a second weight.

* * * * *